United States Patent [19]
Lohr

[11] Patent Number: 5,690,198
[45] Date of Patent: Nov. 25, 1997

[54] GANGED ELECTRIC CORD REELS

[76] Inventor: Dieter Lohr, 2705 Newlands Ave., Belmont, Calif. 94002

[21] Appl. No.: 751,885

[22] Filed: Nov. 18, 1996

[51] Int. Cl.⁶ .................................................. H02R 11/02
[52] U.S. Cl. ........................... 191/12.2 R; 439/501
[58] Field of Search ........................ 191/12 R, 12.2 R, 191/12.4; 439/4, 501

[56] References Cited

U.S. PATENT DOCUMENTS

| | | | |
|---|---|---|---|
| 2,514,628 | 7/1950 | Cortes | 191/12.4 |
| 3,705,962 | 12/1972 | Banister | 191/12.4 |
| 3,821,496 | 6/1974 | Malone | 191/12.2 R |
| 3,826,879 | 7/1974 | Penn et al. | 191/12.4 |
| 4,141,438 | 2/1979 | Diem | 191/12.4 |
| 4,705,484 | 11/1987 | Lerner et al. | 191/12.4 X |
| 4,713,497 | 12/1987 | Smith | 191/12.2 R |
| 4,721,833 | 1/1988 | Dubay | 191/12.4 |
| 5,101,082 | 3/1992 | Simmons | 191/12.2 |

FOREIGN PATENT DOCUMENTS

| | | | |
|---|---|---|---|
| 633086 | 7/1936 | Germany | 191/12.4 |
| 4-8333 | 1/1992 | Japan | 191/12.4 |

*Primary Examiner*—William E. Terrell
*Assistant Examiner*—Scott L. Lowe

[57] ABSTRACT

A receptacle for mounting a plurality of cord reel inserts, each insert being of the type having a spool carrying a cord inside a case and mounted on a shaft journalled at each end to opposing walls of the case. The shaft has a square end of said shaft extending out of the case and is spring biased to turn in a rewind direction. A disk having an internal cam surface with a shoulder is mounted to turn on each shaft end. A releasable catch, secured to the inside wall of the housing, is spring loaded to engage the disk and, together with the shape of the internal cam surface, permits turning the cord spool in one direction such as to permit extending the cord from the receptacle but engages the shaft to prevent turning in the opposite direction. When the operator depresses a spring biased button, the disk is released from the catch permitting the spring biased spool to turn and rewind the cord. In another embodiment, a lever is rotatably mounted and has one end configured to engage the shoulder on the disk to prevent retraction of the cord. The lever is biased by a weight such that if the cord is first "jerked" and then released, the catch will not engage the disk and the cord will uninterruptedly rewind the cord.

3 Claims, 4 Drawing Sheets

GANGED ELECTRIC CORD REELS

FIELD OF THE INVENTION

This invention relates an apparatus for arranging gangs of electric cords such as are required for computing systems, particularly where each cord is arranged on a reel and is pluggable into neighboring computer components.

BACKGROUND AND INFORMATION DISCLOSURE

A common inconvenience with setting up and operating a computer center is the arranging of the many electric cords that are required, at least one for each component of the system including printers, disk drives, cental processing units, modems and fax machines. The most usual arrangement is an array of electrical (110 volts) female receptacles arranged in a row on an oblong block. The block may have a reset relay and surge protector. The problem with this arrangement is that, because of the number of components, the length of the individual cords must be sufficiently long to accommodate a reasonable distance between the block of receptacles and the component.

Numerous descriptions of devices for storing and retracting cords have appeared in the patent literature.

U.S. Pat. No. 3,826,879 to Penn et al discloses a retractable cord reel assembly comprising a stationary bracket and a cord reel having a pair of dished metal flanges which sandwich a non-conducting hub. One dished flange contains a spring motor for rewinding the reel and the other dished flange contains a contactors for contacting the ends of the cord.

U.S. Pat. No. 4,721,833 to Dubay discloses a retractable cord reel having a retractable reel on a base and a drive motor disposed in the hub of the reel.

U.S. Pat. No. 5,101,082 to Simmons et al discloses a housing enclosing a spool journalled on a shaft for storing the cord. A spring is biased to rewind the cord. Electrical continuity from the cord to a power source is established through stator contacts in the housing and rotor contact rings on the spool. The reel includes an electric switch and camming ratchet ring for interrupting current to the stator contacts while the cord is being withdrawn or retracted.

FIG. 1 is a prior art view in perspective showing the construction of the typical cord reel insert 10 that fits into a vacuum cleaner such as an Electrolux brand. Such reels are generally available from the typical vacuum cleaner store. There is shown a case 12 with the cord 14 that unwinds from a spring loaded spool that is inside the case 12. The spool is mounted onto a rotatable shaft whose square end 16 extends from the side of the case 12. The shaft is spring loaded (spring inside case 12) to turn in one direction so that if the cord is extended from the case and then released, the cord will retract into the case. Two leads 13 are shown which lead out to a source of power.

None of these disclosures addresses the problem of convenient storage and arrangement of the plurality of cables that are required for a typical computing system. The problem is particularly attendant in situations such as booths and displays at trade shows where the computing system is set up for a few days and then dissembled and moved to another location.

SUMMARY

It is an object of this invention to provide a receptacle for housing a plurality of cord reel inserts whereby each cord may be extended from the receptacle by a length independent of the lengths of the other cords and retracted individually when required. This invention is directed toward a housing which is substantially cylindrical in the preferred embodiment in which reel inserts of the prior art may be mounted inside the housing coaxially with the housing and with one another. Ends of the individual cords extend through openings in the housing. A disk with an internal cammed surface with at least one shoulder is mounted on the square end of the shaft of each insert. In one embodiment, a slidable catch for each insert is mounted on the interior wall of the housing and is spring loaded toward a first position lacking the spool of the insert to the disk until released by the operator depressing a button.

In another embodiment, the catch is a weight biased lever and the cord is retracted by jerking the cord in the extended direction, then releasing the cord allowing the cord to retract at a speed above which, the lever catch will not engage the cam disk mounted on the spool.

DESCRIPTION OF A PREFERRED EMBODIMENT

Figure 1:
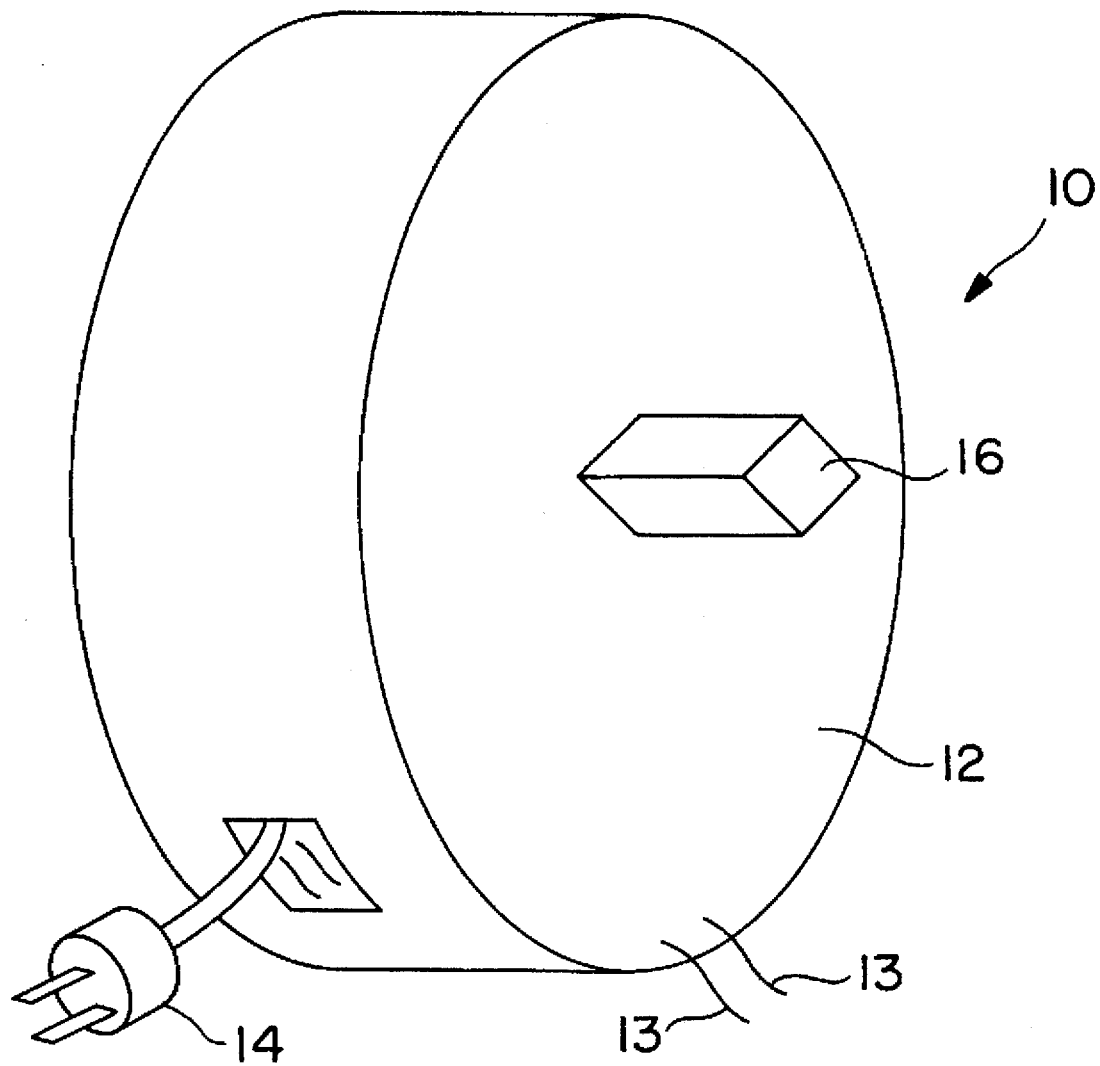
FIG. 1 shows a cord reel insert of the prior art.
Figure 2:
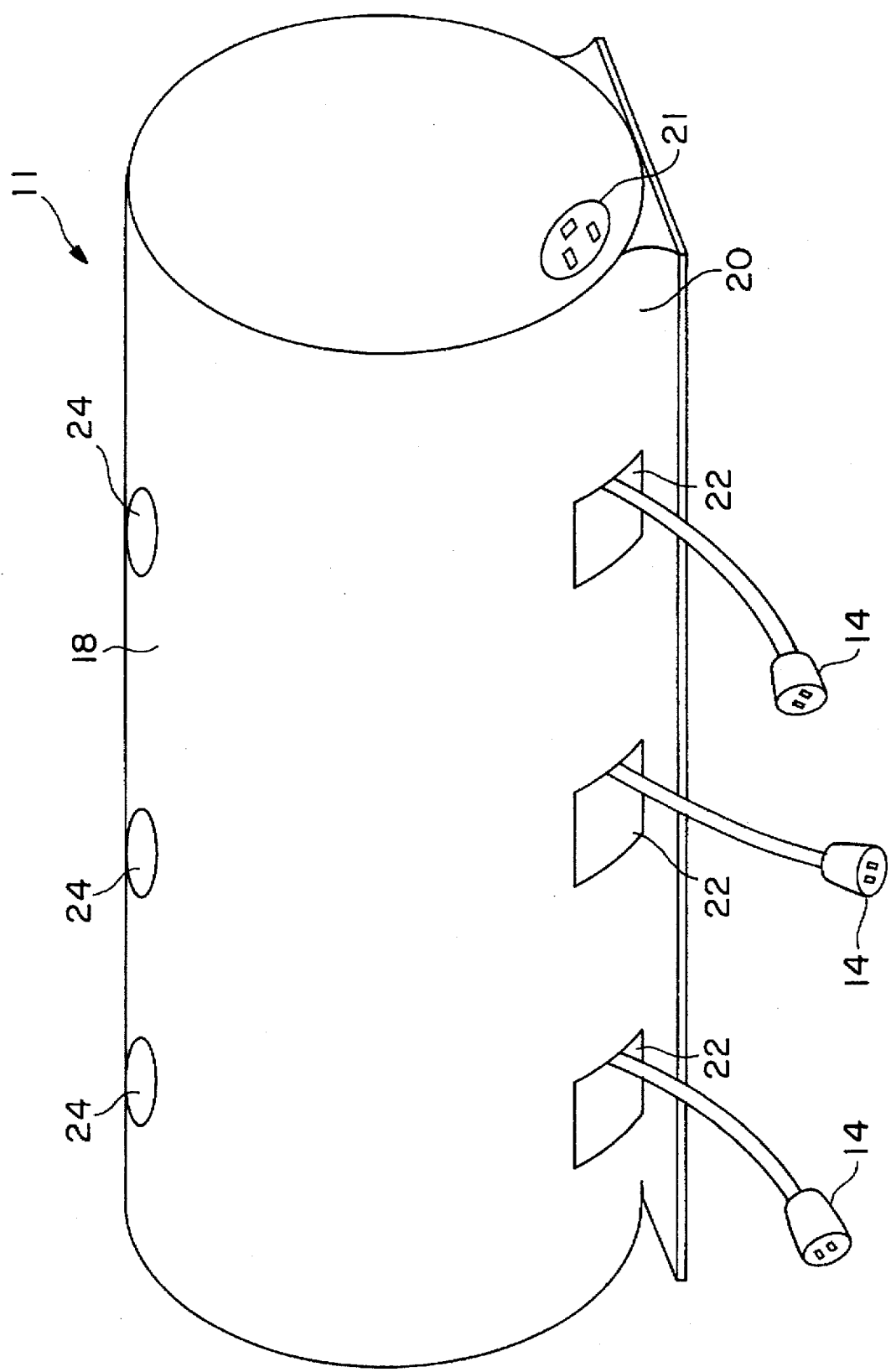
FIG. 2 shows the receptacle of this invention housing inserts of the prior art.

Turning now to a discussion of the drawings, FIG. 2 is a perspective assembly view of the invention 11. There is shown a cylindrical housing 18 supported on a base 20. Three openings 22 are shown from each of which extends one of three extension cords 14. Each cord 14 may be withdrawn from the housing 18 by simply pulling on the cord when it is desired to retract any one of the cords back into the housing, one of the buttons 24 is depressed causing the cord to retract back into the housing. A receptacle 21 for power from a voltage source is shown which is connected in parallel to leads 13 (FIG. 1) of cords from each insert.

Figure 3:
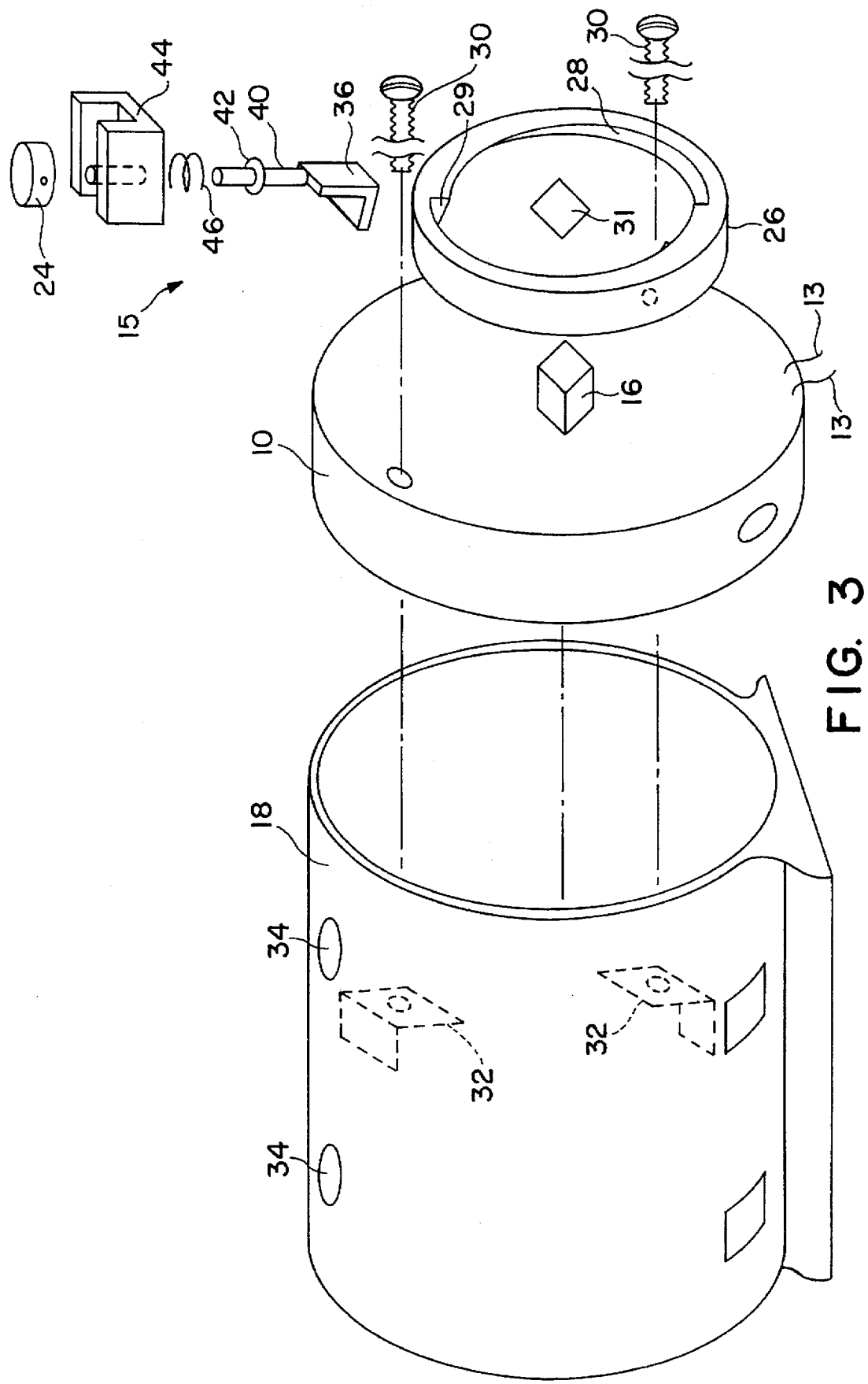
FIG. 3 is an exploded view of the receptacle of FIG. 2.
Figure 4:
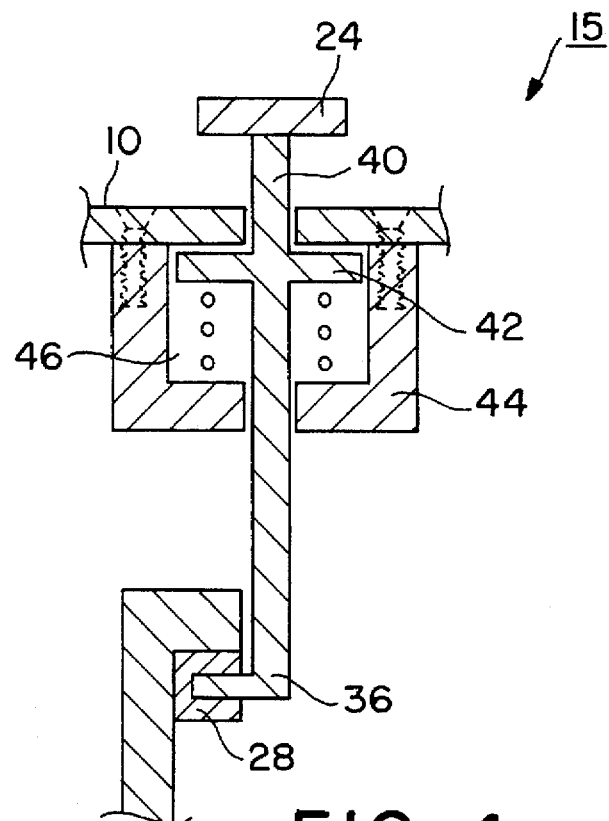
FIG. 4 is a sectional view showing details of the catch for controlling rewinding of the cord.

FIG. 3 is an exploded view of FIG. 2 showing the cylindrical housing 18 with one of two reel assemblies withdrawn from the housing and dissembled. There is shown the reel insert 10 discussed in connection with FIG. 1. Reel insert 10 is secured by bolts 30 against angle flanges 32 which are attached to the interior wall of the housing 10. A disk 26 having an internal cam surface 28 with steps 29 is mounted on the square end of shaft 16. Disk 26 has a centrally located square aperture 31 for slidingly engaging square end 16. A release mechanism 15 is shown in FIGS. 3 and 4. The release mechanism 15 includes an angle catch 36 shown attached to a rod 40 that has a retaining shoulder 42 and extends out through an aperture 34 in housing 18. Bracket 44 retains the angle catch 36 against the interior wall of housing 10. Spring 46 biases the lip of catch 36 into engagement with the cam surface 28 so that when the cord 14 is pulled out of the housing 10, shaft 16 turns freely in the unwind direction and when the operator releases the cord, the spring bias in the reel causes the shaft 16 to start to retract but is prevented from doing so by engagement of catch 36 with the shoulder 29 of cam surface 28. When the operator depresses button 24 catch 36 is disengaged from shoulder 29 and the spring loaded spool inside reel insert 10 turns to reel in the cord. Electrical connections of leads 13 of each reel insert are made to receptacle 21.

Figure 5:
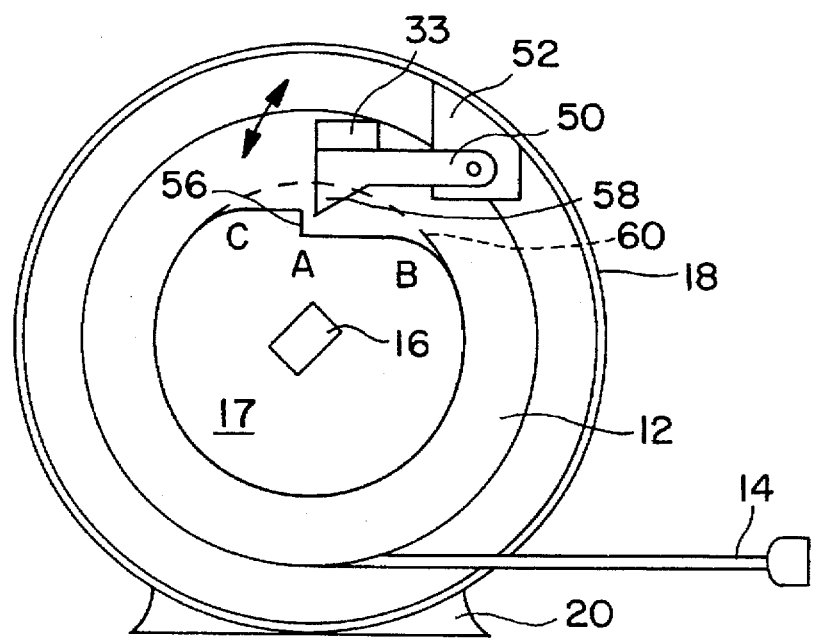
FIG. 5 shows a second embodiment of the invention.

FIG. 5 shows another embodiment of the invention in which each cord is released to retract by jerking on the cord so as to release the retraction blocking mechanism. FIG. 5 shows the reel assembly 12 with the electric cord 14 and protruding square shaft 16. The disk 17, mounted on square shaft 16, has a shoulder 56 at location A and departs from a circular circumference between locations A and C and between locations A and B. A lever 50 is biased with weight 33 and rotationally mounted by bracket 52 on the inside surface of housing 18 and has a catch end 58 constructed to engage shoulder 56 when the spring biased spool (not shown in FIG. 5) attempts to retract the cord 14. However, if the cord 14 is given a quick jerk in the extended diection and then released, the spool is biased strongly enough to turn at a speed where the catch end 58 of the lever will not engage the shoulder but will, instead follow the dashed line 60 so that the cord 14 will be retracted.

Modifications and variations of this invention may be suggested by reading the specification and studying the drawings which are within the scope of the invention.

For example, the base may be provided with suction cups to prevent slippage of the housing.

The housing 10 may be provided with a surge protector and/or a relay fuse.

The housing may be supported vertically.

The device may be designed to accommodate low voltage applications (such as 24 volts, ac or d.c. for telephone lines or data lines) as well as domestic applications such as 110 volts.

Therefore, the scope of invention is to be defined by the appended claims.

What is claimed is:

1. A holder for distributing electrical power from a single electrical power source to a plurality of outlet power cords, each power cord mounted on a respective one of a plurality of cord reel inserts, each insert being of the type having a spool carrying a respective cord inside a case and mounted on a shaft, said shaft being journalled at each end to opposing walls of the case wherein a square end of said shaft extends out of said case and wherein said spool is spring biased to turn in a rewind direction and wherein each said power cord has one end terminating through a brush connection inside said respective case to terminals on said respective case and another end extending from said respective case, said holder comprising:

a housing having an interior wall;

bracket: means (32) for securing each one of said inserts to said inferior wall of said housing;

a plurality of disk for controlling retraction of said, power cords of each insert, respectively, each disk having a cam surface with at least one shoulder on said cam surface;

one of said plurality of disks securely mounted on each shaft of said plurality of inserts and mounted to rotate with said respective shaft;

a plurality of catch means, each catch means mounted in said housing, one catch means for each insert for engaging said at least one shoulder of said cam surface when said respective catch means is in a first position arranged to prevent said disk from turning in a winding direction and allowing said disk to turn in an unwinding direction power cords of each insert, respectively, each respective catch means being disengaged from said shoulder of said cam surface such as to allow said disk to turn in a winding direction;

a plurality of biasing means, each one of said plurality of biasing means for biasing each respective catch means toward said first position;

a plurality of release means, each one of said plurality of release means for releasing each respective catch means to said second position and thereby permitting the respective insert to retract its cord when the cord is in an extended position;

a common electrical power cord connecting said single electrical power source to said terminals on each said case;

a plurality of openings in said housing; and each insert having said another end of its cord extending through a respective one of said openings and away from said housing whereby a user is enabled to grasp any one of said cords of said plurality of inserts and pull on said cord such as to unwind said cord from said respective insert and then release said cord such that said cord is fixed in an extended condition then controllably rewind said cord by activating a respective one of said plurality of release means.

2. The holder of claim 1 wherein:

each said cam surface is an internal cam surface with said at least one shoulder on said internal cam surface;

each catch means being slidably mounted in said housing;

each one of said plurality of biasing means is a spring arranged for biasing each respective catch means toward said first position;

each said release means having a button for moving said catch means to said second position when said button is depressed:

each button of each release means being accessible to a user through an opening in said housing whereby a user is enabled to grasp any one of said cords of said plurality of inserts and pull on said cord such as to unwind said cord from said respective insert and then release said cord such that said cord is fixed in an extended condition then controllably rewind said cord by depressing a respective one of said plurality of buttons.

3. The holder of claim 1 wherein:

each catch means is a lever having one end rotatably mounted inside said housing and another end configured to ride on said cam surface and engage said shoulder;

each one of said biasing means is a weight arranged to bias said lever to rotate toward said first position and operably constructed to enable said lever to engage said shoulder when said disk is rotating at a speed less than a critical speed and remain disengaged from said shoulder when said disk is rotating at a speed eater than said critical speed.

* * * * *